(12) United States Patent
Nakamura et al.

(10) Patent No.: US 12,344,106 B2
(45) Date of Patent: Jul. 1, 2025

(54) METHOD FOR PROVIDING VEHICLE CHARGING SERVICE, AND VEHICLE CHARGING SYSTEM

(71) Applicant: TOYOTA JIDOSHA KABUSHIKI KAISHA, Toyota (JP)

(72) Inventors: Toshihiro Nakamura, Shizuoka-ken (JP); Katsuya Kobayashi, Okazaki (JP); Hiroki Murata, Gotemba (JP); Hiroshi Matsumori, Mishima (JP); Naohiro Seo, Shizuoka-ken (JP); Akihiro Kusumoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 651 days.

(21) Appl. No.: 17/842,227

(22) Filed: Jun. 16, 2022

(65) Prior Publication Data
US 2022/0402383 A1     Dec. 22, 2022

(30) Foreign Application Priority Data
Jun. 21, 2021     (JP) ................. 2021-102253

(51) Int. Cl.
*B60L 53/122*     (2019.01)
*B60L 53/126*     (2019.01)
*H02J 50/12*     (2016.01)

(52) U.S. Cl.
CPC ........... *B60L 53/122* (2019.02); *B60L 53/126* (2019.02); *H02J 50/12* (2016.02)

(58) Field of Classification Search
None
See application file for complete search history.

(56) References Cited

U.S. PATENT DOCUMENTS 6,307,347 B1 * 10/2001 Ronning ................ B60L 53/16
                                                                    320/109
2022/0009369 A1 * 1/2022 Treadway ............... B60L 53/63

FOREIGN PATENT DOCUMENTS

JP         2016-217770 A      12/2016

* cited by examiner

*Primary Examiner* — Julian D Huffman
*Assistant Examiner* — Sadia Kousar
(74) *Attorney, Agent, or Firm* — Dinsmore & Shohl LLP

(57) ABSTRACT

A vehicle is capable of receiving electric power supplied from a charger and capable of receiving electric power supplied from a charging mat. The charging mat is movable and capable of wireless power transfer. A method for providing a vehicle charging service includes a first step and a second step. The first step is giving, by a server, an instruction for installing the charging mat on a lane at which charging congestion is detected or predicted to occur, the charging congestion being traffic congestion for charging the electric power supplied from the charger. The second step is transmitting the electric power from the charging mat when the vehicle is detected above the charging mat installed on the lane in accordance with the instruction, and transmitting no electric power from the charging mat when the vehicle is not detected above the charging mat.

6 Claims, 7 Drawing Sheets

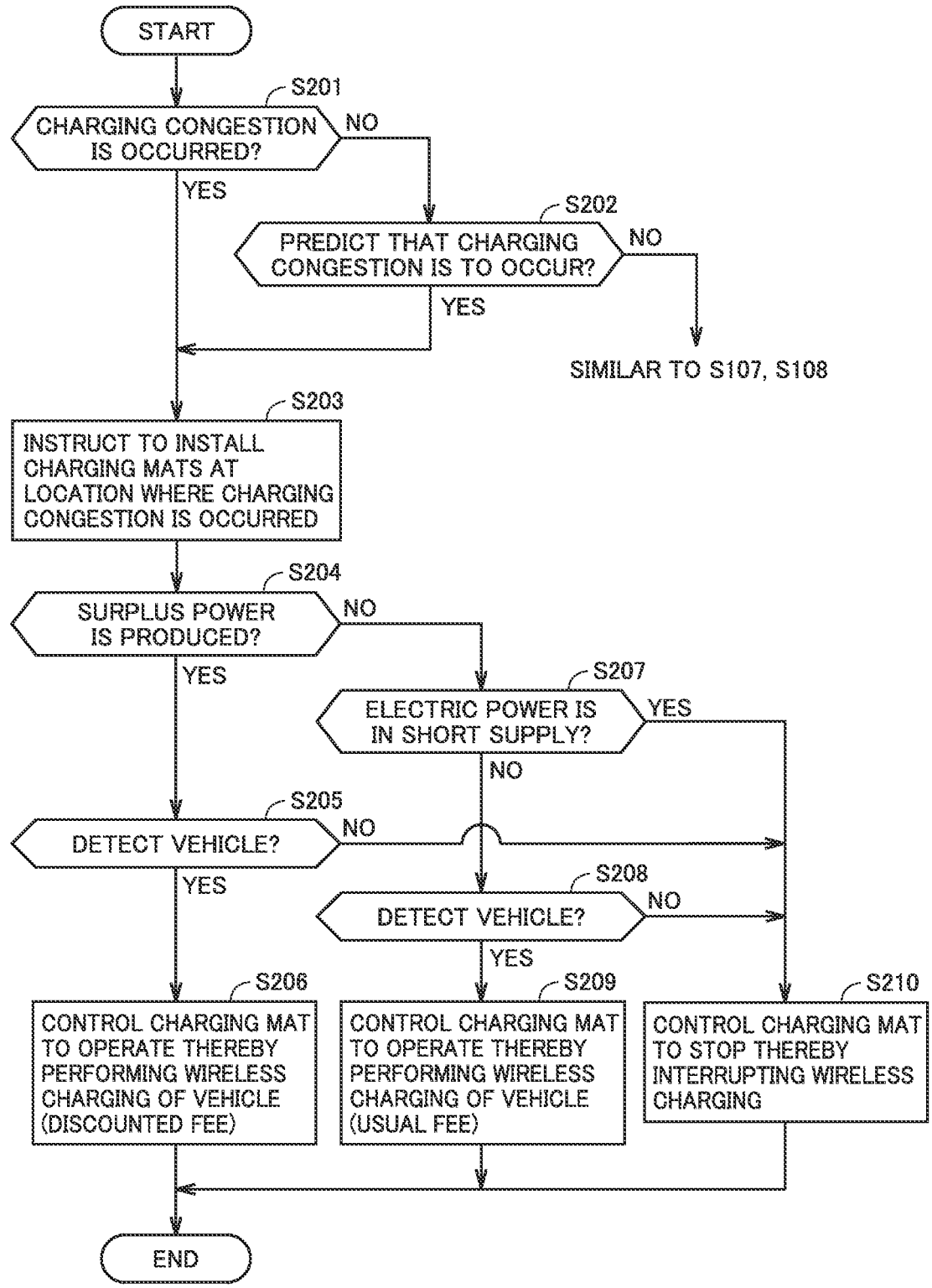

METHOD FOR PROVIDING VEHICLE CHARGING SERVICE, AND VEHICLE CHARGING SYSTEM

CROSS REFERENCE TO RELATED APPLICATIONS

This nonprovisional application claims priority to Japanese Patent Application No. 2021-102253 filed on Jun. 21, 2021 with the Japan Patent Office, the entire content of which is hereby incorporated by reference.

BACKGROUND

Field

The present disclosure relates to a method for providing a vehicle charging service, and a vehicle charging system.

Description of the Background Art

Japanese Patent Laying-Open No. 2016-217770 discloses the information display device for displaying the information on a charging station for charging the secondary battery mounted on an electric-powered vehicle. If a traffic congestion has occurred around the electric-powered vehicle on the route by way of the charging station, the navigation unit included in the information display device searches for charging stations present on or near a route to the destination. Then, for each charging station searched, the navigation unit calculates a time taken by the electric-powered vehicle to arrive at the destination by way of the charging station.

SUMMARY

In general, a required amount of time for charging by the charging equipment installed at the charging station or the like is longer than fueling at a gas station. Due to this, a traffic congestion may occur at or around the charging equipment, caused by vehicles waiting for charging. Hereinafter, such a traffic congestion will be referred to as "charging congestion." Japanese Patent Laying-Open No. 2016-217770 fails to consider any measure to alleviate the charging congestion.

The present disclosure is made to solve the problem above, and an object of the present disclosure is to alleviate charging congestion.

(1) A method for providing a vehicle charging service according to a certain aspect of the present disclosure is provided, by a server, for charging a vehicle by fixed charging equipment. The vehicle is capable of receiving electric power supplied from the charging equipment and receiving electric power supplied from a charging mat. The charging mat is movable and capable of wireless power transfer. The method includes a first step and a second step. The first step is giving, by the server, an instruction for installing the charging mat on a lane at which charging congestion is detected or predicted to occur, the charging congestion being traffic congestion for charging of the electric power supplied from the charging equipment. The second step is transmitting the electric power from the charging mat when the vehicle is detected above the charging mat installed on the lane in accordance with the instruction, and transmitting no electric power from the charging mat when the vehicle is not detected above the charging mat.

In the configuration (1) above, the charging mat is installed when charging congestion for charging by the charging equipment (e.g., plug-in charging) is detected or predicted to occur. This allows wireless transmission of electric power on vehicles, which are stopped or traveling only at low speeds due to the charging congestion. As much as the electric power these vehicles are wirelessly charged with is deducted from the amount of electric power to be charged subsequently by the charging equipment, thereby reducing the time taken for charging by the charging equipment. Thus, according to the configuration (1) above, the charging congestion can be alleviated. In addition, impact of an electromagnetic field that is formed around the charging mat can be reduced by not performing the wireless transmission of electric power when no vehicle is detected above the charging mat.

(2) The method further includes giving, by the server, an instruction for removing the charging mat installed on the lane when conditions for relieving the charging congestion are met.

According to the configuration (2) above, the charging mat is removed when the conditions for relieving charging congestion are met. Thus, the removed charging mat can be used for alternative use (e.g., to alleviate charging congestion somewhere else). In other words, effective use of the charging mat is possible.

(3) The method further includes giving, by the server, an instruction for installing other charging mat on a route bypassing the lane at which the charging congestion is detected or predicted to occur, the other charging mat being movable and capable of wireless transmission of electric power.

According to the configuration (3) above, other charging mats are installed on the detour route, thereby leading the vehicle to the detour route. Thus, the charging congestion can be further alleviated.

(4) The charging mat transmits electric power supplied from a power system to a microgrid. The method further includes facilitating, by the server, transmission of the electric power from the charging mat when surplus power is produced at the power system, as compared to when no surplus power is produced at the power system.

(5) The charging mat transmits electric power supplied from a power system to a microgrid. The method further includes reducing, by the server, transmission of the electric power from the charging mat when the electric power from the power system is in short supply, as compared to when the electric power from the power system is not in short supply.

In the configurations (4) and (5) above, the transmission of electric power from the charging mat is facilitated if surplus power is produced at the power system, and the transmission of electric power from the charging mat is reduced in the event of short supply of electric power from the power system. Controlling the transmission of electric power from the charging mat in this manner can contribute to adjustment of the electric-power supply-demand balance of the power system.

(6) A vehicle charging system according to another aspect of the present disclosure used to charge a vehicle by fixed charging equipment. The vehicle charging system includes: a charging mat that is movable and capable of wireless transmission of electric power; and a server that controls the charging mat. The vehicle is capable of receiving electric power supplied from the charging equipment and receiving the electric power transmitted from the charging mat. The server controls the charging mat so that the charging mat moves to a lane at which charging congestion is detected or predicted to occur, the charging congestion being traffic congestion for charging the electric power supplied from the charging equipment. After moving to the lane, the charging mat performs wireless power transfer when the vehicle is detected above the charging mat, and does not perform the wireless power transfer when the vehicle is not detected above the charging mat.

According to the configuration (6) above, charging congestion can be alleviated, similarly to the configuration (1) above.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 is a flowchart illustrating a procedure for alleviating charging congestion, according to Embodiment 2.

DETAILED DESCRIPTION

Hereinafter, an embodiment according to the present disclosure will be described in detail, with reference to the accompanying drawings. Note that the same reference sign is used to refer to the same or like parts, and the description thereof will not be repeated.

Embodiment 1

<System Configuration>

Figure 1:
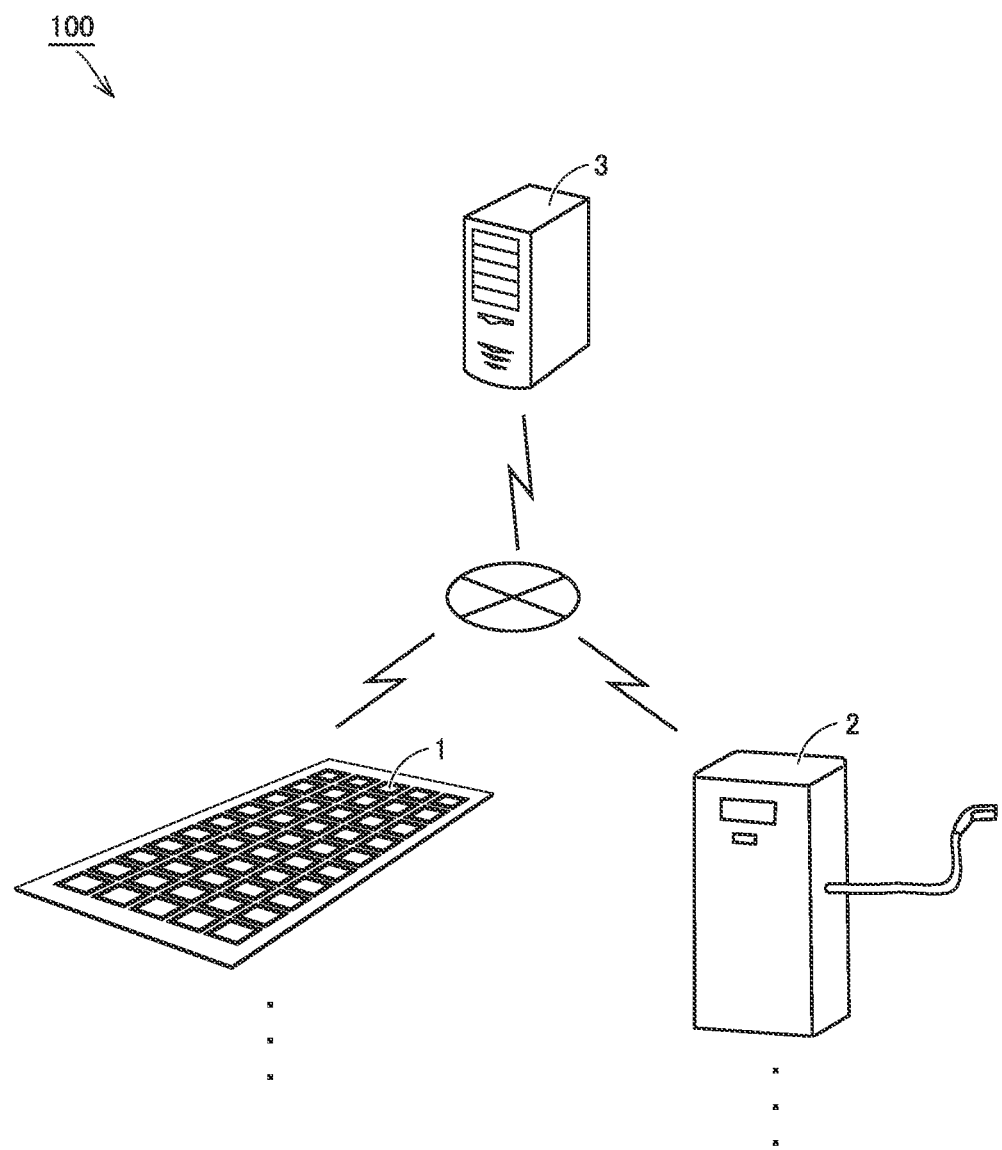
FIG. 1 is a diagram schematically showing a configuration of a vehicle charging system according to Embodiment 1 of the present disclosure.

FIG. 1 is a diagram schematically showing a configuration of a vehicle charging system according to Embodiment 1 of the present disclosure. A vehicle charging system 100 includes multiple charging mats 1, multiple chargers 2, and a server 3.

The charging mats 1 are each a power transmission device formed in a mat and capable of wireless transmission of electric power. Hereinafter, wireless charging by the charging mat 1 will be referred also to "wireless charging." A specific configuration of the charging mat 1 will be described with respect to FIG. 2.

The chargers 2 are each charging equipment capable of transmitting electric power to an inlet 42 (see FIG. 2) of a vehicle 4 via a charging cable. Each charger 2 is fixed to the ground of a location, such as a charging station. Hereinafter, wireless charging by the charger 2 will be referred also to "plug-in charging."

The server 3 includes a processor and a memory (none of which are shown). The processor is, for example, a central processing unit (CPU), and executes the arithmetic processes written in programs. The memory stores programs for execution by the processor and stores various data (maps, relational expressions, parameters, etc.) that are used in the programs. The memory also has a function of temporarily storing results of arithmetic processes and data. The server 3 is capable of two-way communications with each charging mat 1 via a network, such as the Internet. The server 3 is also capable of two-way communications with the charger 2 and the vehicle 4 via the network.

The server 3 manages charging of the vehicle 4 that are performed by the charging mat 1 and by the charger 2. More specifically, the server 3 holds the specification information and obtains the usage information for each of the charging mats 1 and the charger 2. The server 3 is also capable of obtaining, from an external server (not shown), latest road information, traffic congestion information, weather information, etc. In this example, the server 3 also manages charging of fee for charge using the charging mats 1 and the charger 2. Note that the server 3 may be divided in multiple servers by function.

<Configuration of Charging Mat>

Figure 2:
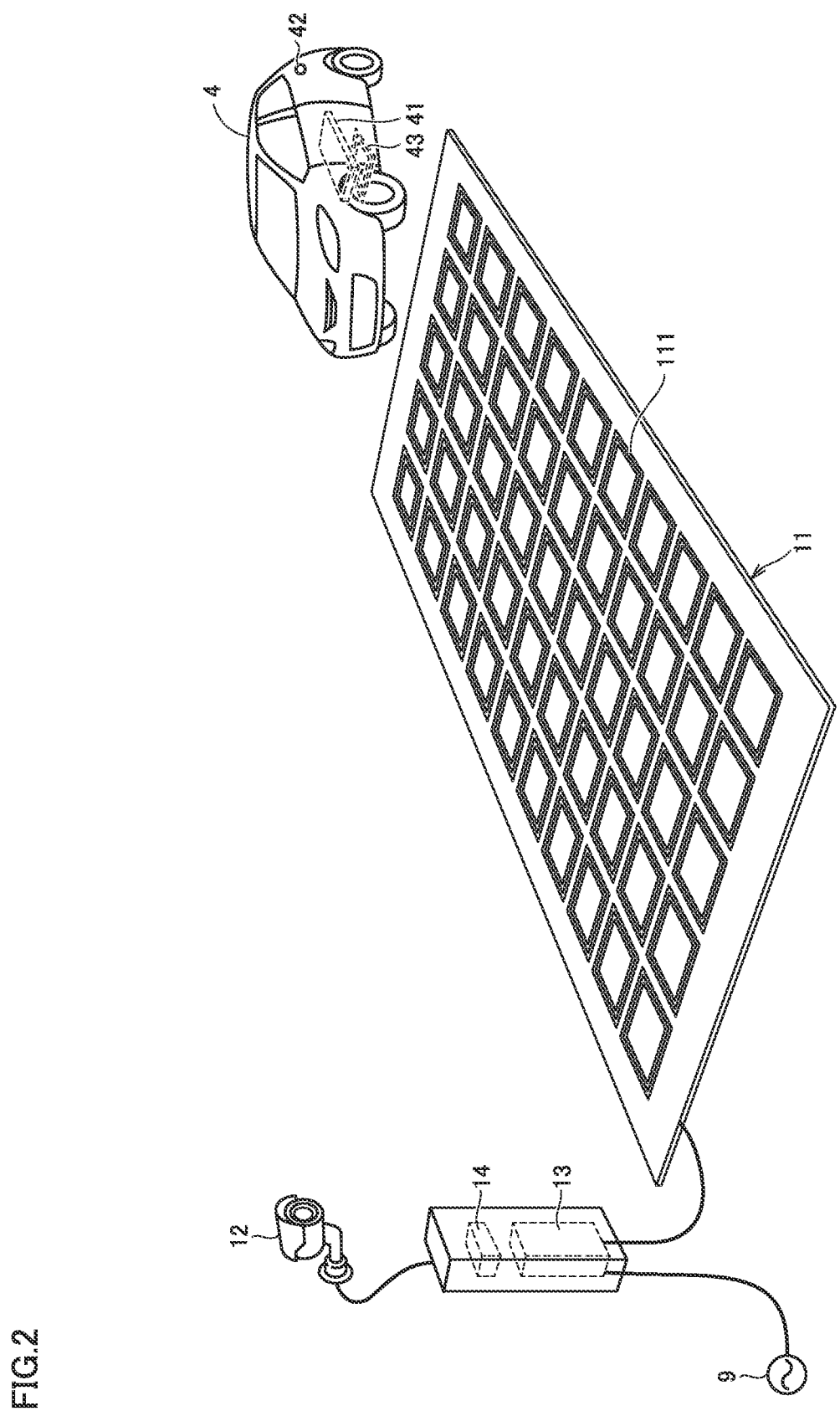
FIG. 2 is a diagram showing one example of a specific configuration of a charging mat.

FIG. 2 is a diagram showing one example of a specific configuration of the charging mat 1. The charging mat 1 includes a ground unit 11, a sensor unit 12, a power conversion unit 13, and a controller 14.

The ground unit 11 has a mat shape, and is disposed on the road surface of a driving lane for the vehicle 4. The ground unit 11 is portable, instead of being fixed to the road surface. The ground unit 11 is, for example, fetched from a storage location by an operator who has a certain knowledge or qualification, and installed on the road surface. In order to facilitate the portability at this time, the ground unit 11 may have flexibility and be wound during transport. Alternatively, the ground unit 11 may have multiple driving wheels (not shown) on the road surface side and move (run) on its own.

The ground unit 11 includes multiple transmitter coil units 111. The transmitter coil units 111 are each capable of wireless transmission of electric power, in accordance with a control signal from the controller 14, when the vehicle 4 is located above the transmitter coil unit 111. While FIG. 2 shows ten transmitter coil units 111 disposed in the lengthwise direction and five transmitter coil unit in the widthwise direction, it should be noted that the number of transmitter coil units included in the ground unit 11 and the arrangement of the transmitter coil units are not particularly limited.

The sensor unit 12 detects the location of the vehicle 4 passing through over the ground unit 11, and outputs a detection signal to the controller 14. The sensor unit 12, for example, includes at least one of a camera, a radar, and a LIDAR (Laser Imaging Detection And Ranging) (none of which are shown). Note that, instead of one sensor unit 12 being provided for the ground unit 11, a sensor (such as an optical sensor or a weight sensor) for detecting the location of the vehicle 4 may be provided for each transmitter coil unit 111.

The power conversion unit 13 is electrically connected to an external alternating-current (AC) power supply 9 (typically, a commercial power supply). The AC power supply 9 is electrically connected to a microgrid MG (see FIG. 6) in an example described below. The power conversion unit 13 converts the voltage of an AC power supplied from the AC power supply 9 into an appropriate value. The power conversion unit 13 then outputs the AC power obtained by the conversion to a selected one of the transmitter coil units 111 included in the ground unit 11.

The controller 14 is capable of two-way communications with the server 3 (see FIG. 1) via a communication module (not shown), and controls the power conversion unit 13 in accordance with commands from the server 3. More specifically, the controller 14 locates the vehicle 4, based on a detection signal from the sensor unit 12. The controller 14 then controls the power conversion unit 13 so that an AC power is output to a transmitter coil unit that is located under the vehicle 4, among the transmitter coil units 111. For example, if the vehicle 4 is detected above a certain transmitter coil unit, the controller 14 selects this transmitter coil unit. Doing so passes an AC current through the transmitter coil included in the transmitter coil unit, thereby forming an electromagnetic field around the transmitter coil. This transfers electric power to the receiving coil within a power receiving device 43 (described later) included in the vehicle 4 (wireless charging). Subsequently, if the vehicle 4 is no longer detected above the transmitter coil unit, the controller 14 unselects the transmitter coil unit, thereby stopping the AC power from being output to the transmitter coil unit. Such a set of controls is performed for each transmitter coil unit, thereby allowing wireless transmission of electric power to the vehicle 4 even while the vehicle 4 is traveling. The electric power can be, of course, wirelessly transmitted to the vehicle 4 while the vehicle 4 is stopped.

The vehicle 4 is capable of both plug-in charging and wireless charging. The vehicle 4 is a battery electric vehicle (BEV) or a plug-in hybrid electric vehicle (PHEV) in the example shown in FIG. 2. However, the type of the vehicle 4 is not limited thereto. The vehicle 4 may be, for example, a compact mobility having a passenger capacity of 1 or 2 persons. The vehicle 4 may also be an automated-driving vehicle used to carry a load unattended. The vehicle 4 includes a battery 41, the inlet 42, and the power receiving device 43.

The battery 41 is an assembled battery formed of multiple cells. Each cell is a secondary battery, such as a lithium-ion battery or a nickel-hydrogen battery. The battery 41 supplies a motor generator (not shown) with electric power for generating a driving force for the vehicle 4. The battery 41 also stores electric power that is generated by the motor generator. A capacitor, such as an electric double layer capacitor, may be employed, instead of the battery 41.

The inlet 42 can receive the connector of a charging cable 21 (see FIG. 3) extending from the charger 2. As the connector is inserted into the inlet 42, the inlet 42 and the charger 2 are electrically connected together. This allows electric power to be supplied from the charger 2 to the vehicle 4 (plug-in charging).

Figure 3:
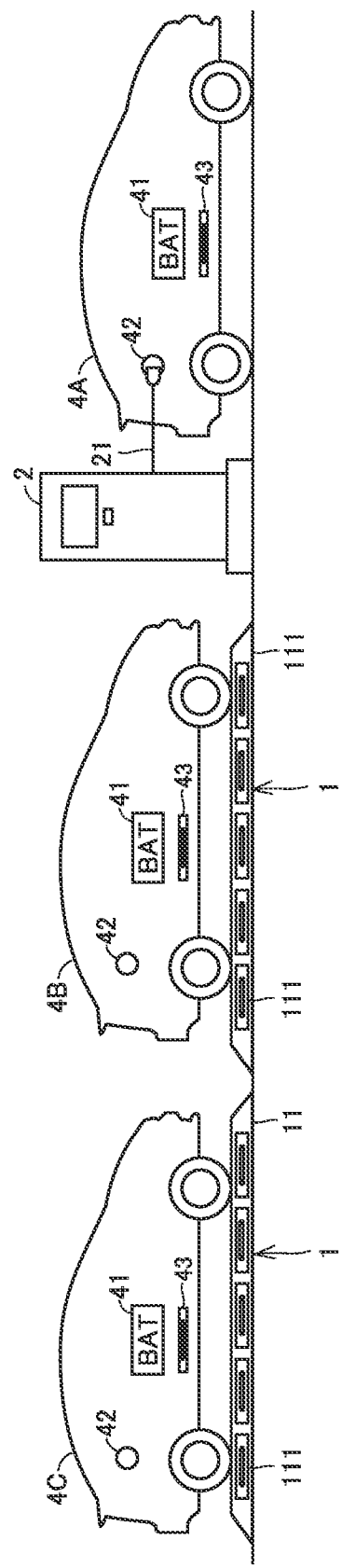
FIG. 3 is a diagram showing one example of a charging congestion alleviation mode according to Embodiment 1.

In the example shown in FIG. 3, the power receiving device 43 is disposed on the lower surface of a floor panel forming the bottom surface of the vehicle 4. A receiving coil is accommodated within the power receiving device 43. The receiving coil wirelessly receives electric power that is transmitted from the charging mat 1. The AC power received by the power receiving device 43 is converted into a direct-current (DC) power by an inverter (not shown) and charged to the battery 41 (wireless charging).

<Alleviating of Charging Congestion>

In many cases, A required amount of time for charging the charger 2 is longer than fueling at a gas station. For example, while fueling typically takes a few minutes, charging can take tens of minutes to a few hours. Due to this, "charging congestion," can occur at or near a charging station where the charger 2 is installed, caused by a line of vehicles waiting for charging.

Thus, in the present embodiment, if charging congestion occurs, the charging mats 1 are installed and, using the charging mats 1, the wireless charging are performed on vehicles 4 involved in the charging congestion. Even if no charging congestion is occurred at a moment, the charging mat 1 may be installed when the occurrence of charging congestion is predicted, and the wireless charging may be performed, using the charging mats 1, on the vehicles 4 which may be involved in charging congestion. In this manner, in the present embodiment, the charging mats 1 are used as a "dynamic charging infrastructure" that can be installed/removed depending on whether charging congestion is occurred. This can alleviate charging congestion, as described below. Note that, "alleviating charging congestion," as used in the present disclosure, encompasses inhibiting charging congestion from occurring, and relieving charging congestion.

FIG. 3 is a diagram showing one example of a charging congestion alleviation mode according to Embodiment 1. Here, assume a situation in which three vehicles 4 are charged. The three vehicles are identified by describing them as 4A, 4B, and 4C. The plug-in charging using the charger 2 is already being performed on the lead vehicle 4A. Meanwhile, the rear two vehicles 4B and 4C are waiting for the vehicle 4A to complete the plug-in charging and their turn to come.

In such a case, the charging mats 1 are installed under the vehicles 4B and 4C. The charging mats 1 may be manually installed by an operator of the charging station, for example. If the charging mats 1 are provided with driving wheels, the charging mats 1 may run on their own under the vehicles 4B and 4C.

The server 3 makes inquiries of the drivers of the vehicles 4B and 4C whether the drivers wish to charge the battery 41 with electric power wirelessly transmitted from the charging mat 1. If the driver sends a response indicating that he/she wishes to charge the battery 41, he/she is charged with a fee according to the charging time or the amount of electric power charged to the battery 41. The payment may be prepayment or deferred payment. The wireless charging by the charging mat 1 is not necessarily paid, and may be free of charge.

Subsequently, the wireless charging are performed on the vehicles 4B and 4C using the charging mats 1. This reduces a required amount of time for the plug-in charging that is performed on the vehicle 4B after the completion of the plug-in charging of the vehicle 4A, as compared to the case where the charging mats 1 are not installed. Furthermore, a required amount of time for the plug-in charging that is performed on the vehicle 4C after the completion of the plug-in charging of the vehicle 4B is likewise reduced by performing the wireless charging on the vehicle 4C during the plug-in charging of the vehicle 4B.

In this manner, in the present embodiment, the use of the charging mats 1 to perform the wireless charging on the vehicle 4 waiting for plug-in charging reduces a required amount of time for the plug-in charging by an amount of time that is required for the plug-in charging to charge the amount of electric power charged through the wireless charging. This alleviates the charging congestion. Stated differently, this inhibits charging congestion from occurring, reduces the time taken to relieve charging congestion. As a result, the wait time for the driver of the vehicle 4 is reduced, thereby improving the convenience of the charging station.

Figure 4:
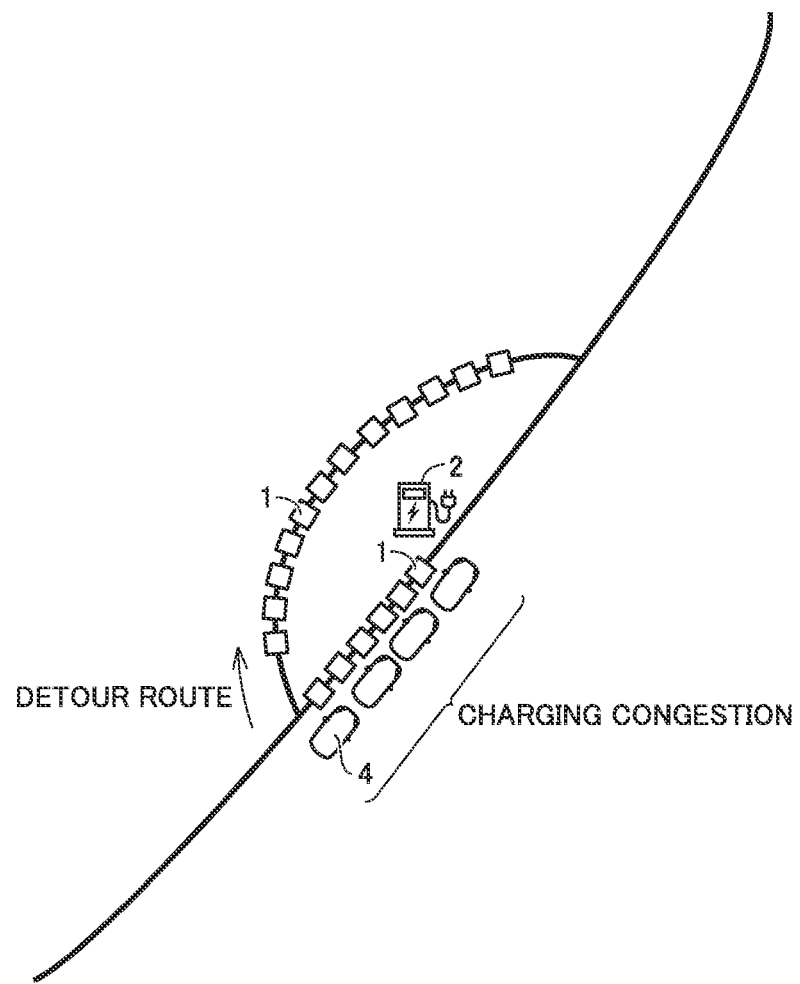
FIG. 4 is a diagram showing another example of the charging congestion alleviation mode according to Embodiment 1.

FIG. 4 is a diagram showing another example of the charging congestion alleviation mode according to Embodiment 1. The location where the charging mats 1 are installed is not limited to the location where charging congestion is occurred, as described with respect to FIG. 3. As shown in FIG. 4, the charging mats 1 may be installed on a travel route (detour route) bypassing the charger 2. If travelled on the detour route, the states of charge (SOC) of the batteries 41 of some vehicles 4 scheduled to use the charger 2 are restored by the wireless charging from the charging mats 1 installed on the detour route, thereby obviating the need for use of the charger 2 or allowing the vehicles 4 to use other chargers that are installed closer than the charger 2 shown in FIG. 4. By leading these vehicles 4 to the detour route to reduce the number of vehicles 4 that use the charger 2, the charging congestion at the charger 2 can be alleviated.

<Process Flow>

Figure 5:
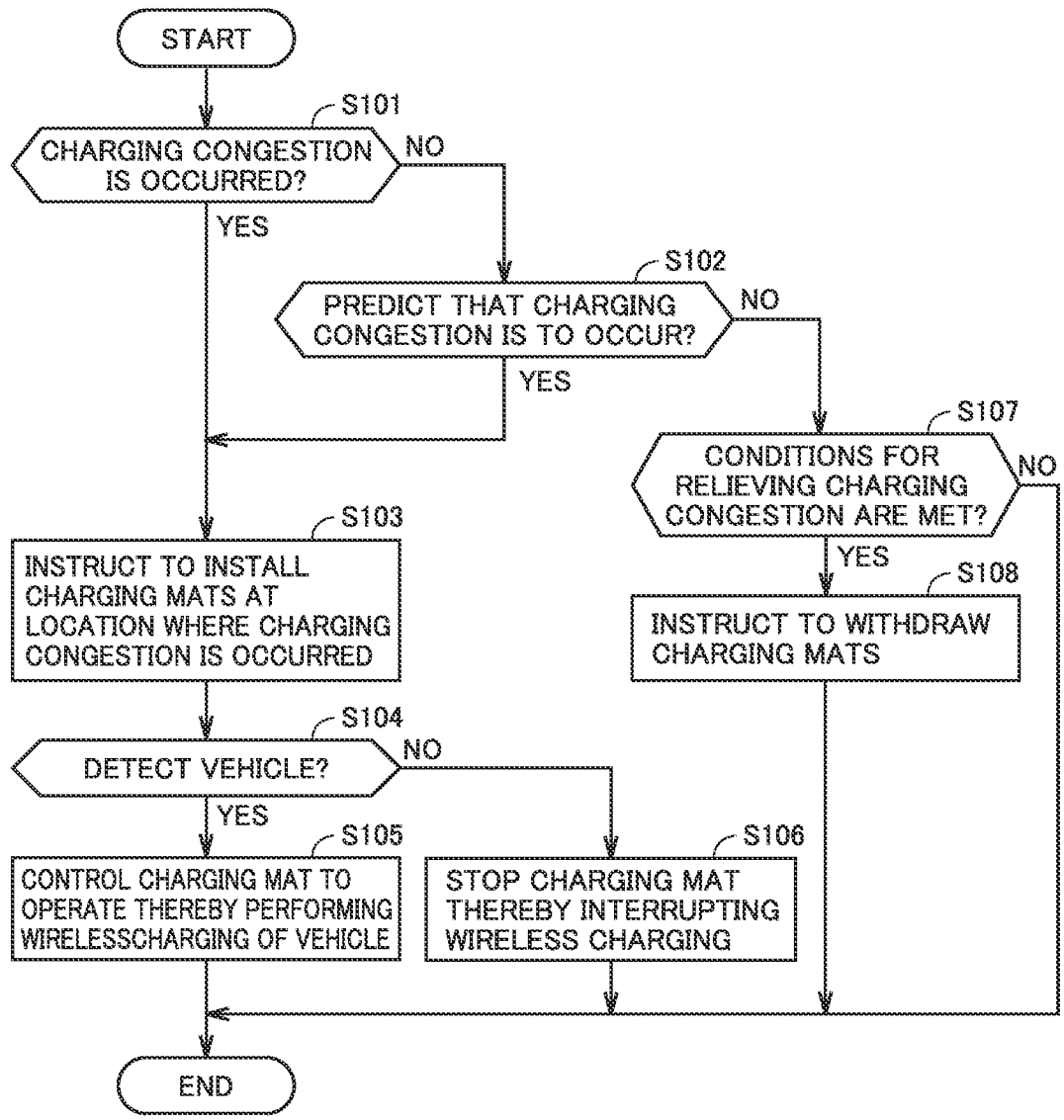
FIG. 5 is a flowchart illustrating a procedure for alleviating charging congestion, according to Embodiment 1.

FIG. 5 is a flowchart illustrating a procedure for alleviating charging congestion, according to Embodiment 1. The procedure shown in this flowchart is invoked from the main routine (not shown) and executed by the server 3 once predetermined conditions are met, for example. Each process step is implemented by software processing by the server 3 or the controller 14. However, each process step may be implemented by hardware (an electric circuit) disposed within the server 3 or the controller 14. Hereinafter, each process step is abbreviated as S.

In S101, the server 3 determines whether charging congestion is occurred at the charger 2. For example, the server 3 can determine whether charging congestion is occurred, based on the location information collected at an external server from respective GPS (Global Pointing System) receivers (not shown) mounted on the vehicles 4. If charging congestion is occurred (YES in S101), the server 3 proceeds to S103.

Even if no charging congestion is occurred at a moment (NO in S101), the server 3 predicts whether charging congestion is to occur around the charger 2 in the near future (e.g., within tens of minutes) (S102). Based on an occurrence history of charging congestion, the server 3 can predict whether charging congestion is to occur, based on, for example, a time period, day-of-the-week, whether it is a weekday/holiday, the weather, etc. The server 3 also proceeds to S103 if charging congestion is predicted to occur (YES in S102).

In S103, the server 3 instructs the operator or self-driving charging mats 1 of the charging station to install the charging mats 1 at the location where charging congestion is occurred (or predicted to occur) at the charger 2. For example, the operator, who has confirmed the instruction displayed on a monitor (not shown) in the charging station, can install the charging mats 1 at the designated location. The charging mats 1 may move on their own in accordance with the instruction from the server 3.

In S104, the controller 14 determines whether the vehicle 4 is detected above the charging mat 1. As mentioned above, the controller 14 may determine whether the vehicle 4 has been detected, based on a detection signal from the sensor unit 12. If the vehicle 4 is detected (YES in S104), the controller 14 controls the power conversion unit 13 to operate. This transmits electric power from the charging mat 1 to the vehicle 4 (S105). If no vehicle 4 is detected (NO in S104), in contrast, the controller 14 stops the power conversion unit 13. This interrupts (stops) the transmission of the electric power from the charging mat 1 to the vehicle 4 (S106).

If no charging congestion is occurred (NO in S101) and no charging congestion is predicted to occur (NO in S102), the controller 14 proceeds to S107 and determines whether the conditions for relieving charging congestion are met. For example, if the business end time of the charging station arrives (which may be the case where the business end time is arriving soon), the controller 14 may determine that the conditions for relieving charging congestion are met. The controller 14 may determine whether the conditions for relieving charging congestion are met, taking into an account the day-of-the-week, whether it is a weekday/holiday, the weather, etc., in addition to or alternative to a time period.

If the conditions for relieving charging congestion are met (YES in S107), the server 3 instructs the operator or the charging mats 1 to withdraw (remove) the charging mats 1 installed at the location of occurrence of the charging congestion (S108). In accordance with the instruction, for example, the operator can withdraw the charging mats 1 and move them to the storage location. The charging mats 1 may automatically move themselves to the storage location, in accordance with the instruction from the server 3.

As described above, in Embodiment 1, if charging congestion is caused (or predicted to occur) by the vehicles 4 waiting for plug-in charging by the charger 2 provided at a charging station or the like, the charging mats 1 are installed along the line of vehicles causing the charging congestion. This allows the vehicles 4, which are stopped or traveling only at low speeds, to perform wireless charging. As much as the electric power the vehicle 4 is wirelessly charged with by the charging mat 1 is deducted from the amount of electric power requested from the subsequent plug-in charging, thereby reducing the time taken for the plug-in charging. Thus, according to Embodiment 1, charging congestion can be alleviated.

In order to alleviate charging congestion, it may also be contemplated to fixedly install a conventional wireless power transmission device. In this case, however, it is difficult to address various situations in which charging congestion occurs. For example, in order to install power transmission devices in a wide area to address long charging congestion that may occur during a long vacation season or the like, the large capital investment can be required. However, the power transmission devices installed in such a wide area may not be fully utilized during off-peak periods. To address this, the charging mats 1, since they are portable (movable), can be installed at a desired location, area, and time of a season. In other words, depending on a situation in which charging congestion occurs, changes can be made as appropriate, to the installation location and installation range of the charging mats 1, and when to install the charging mats 1. Thus, according to Embodiment 1, charging congestion can be effectively alleviated, while reducing the capital investment.

Note that the present embodiment has been described with reference to the charger 2 performing the plug-in charging. However, "charging of a vehicle by fixed charging equipment" according to the present disclosure is not limited to the plug-in charging, and may be charging by a wireless power transmission device buried in the ground. In this case, by using a common power receiving device 43, the vehicle 4 is allowed to receive electric power from the wireless power transmission device and electric power from the charging mat 1.

Embodiment 2

Embodiment 2 will be described with reference to using charging mats 1 for demand response (DR) for adjusting the electric-power supply-demand balance of the power system.

Figure 6:
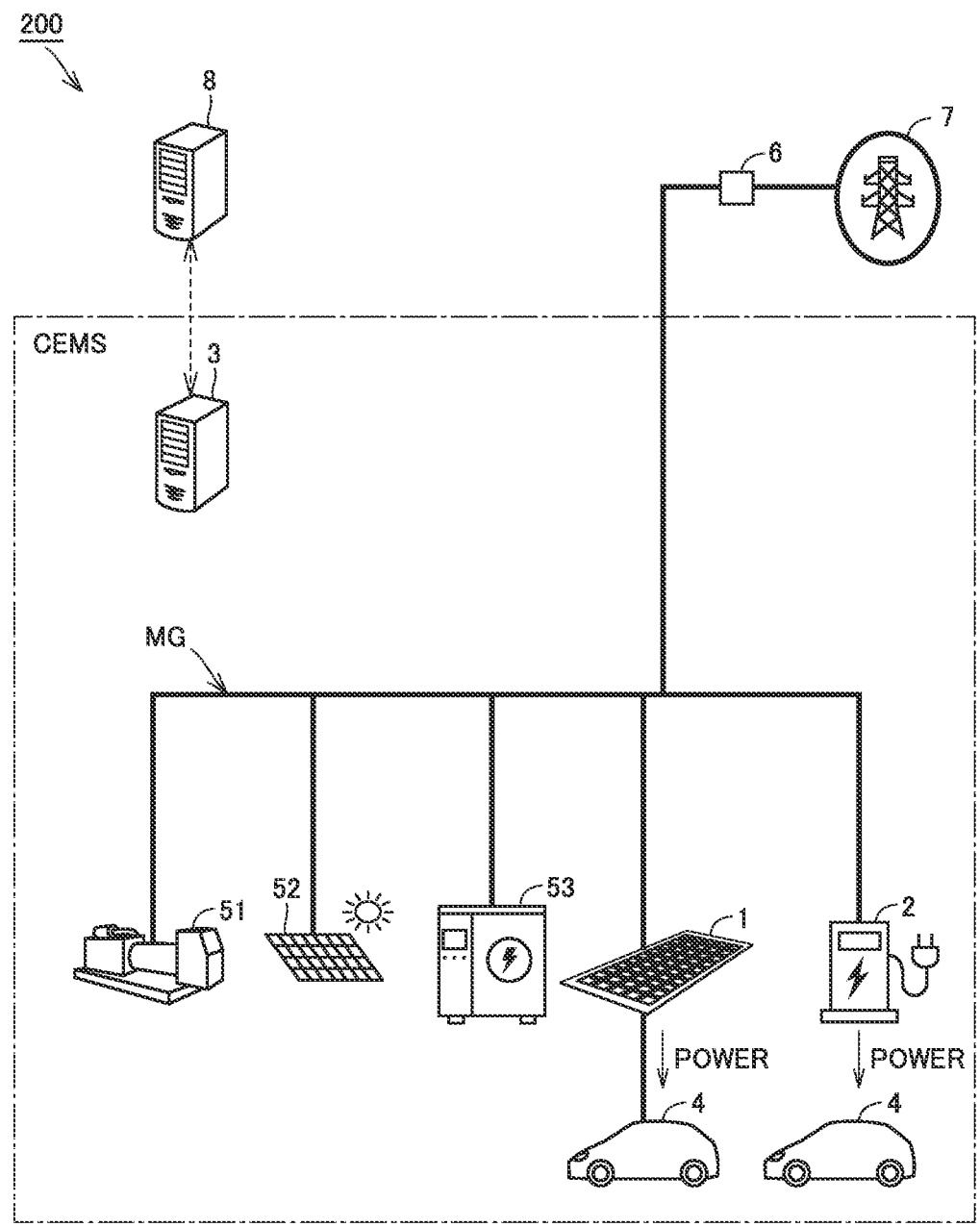
FIG. 6 is a diagram schematically showing an overall configuration of a power system which includes a vehicle charging system according to Embodiment 2.

FIG. 6 is a diagram schematically showing an overall configuration of a power system which includes a vehicle charging system according to Embodiment 2. The power system 200 is, for example, a CEMS, and includes, in addition a charging mat 1, a charger 2, a server 3, a vehicle 4, a generator 51, a variable renewable energy source 52, and a power storage system 53. The CEMS refers to a community energy management system or a city energy management system.

The charging mat 1, the charger 2, the vehicle 4, the generator 51, the variable renewable energy source 52, and the power storage system 53 constitute a microgrid MG. While FIG. 6 shows one instance for each of the components included in the microgrid MG, it should be noted that the actual microgrid MG can include multiple instances of each component.

The generator 51 is a power generation facility independent of a weather condition. The generator 51 outputs generated power to the microgrid MG. The generator 51 can include a steam turbine generator, a gas turbine generator, a diesel engine generator, a gas engine generator, a biomass power generator, a stationary fuel cell, etc. The generator 51 may include a cogeneration system that utilizes heat produced upon electric power generation.

The variable renewable energy source 52 is a power generation facility whose power output varies depending on a weather condition, and outputs the generated power to the microgrid MG. While FIG. 6 illustrates the solar power generation equipment (a photovoltaic panel), the variable renewable energy source 52 may include wind power generation equipment, instead of or in addition to the solar power generation equipment.

The power storage system 53 is a stationary power supply that stores power generated by the variable renewable energy source 52, for example. The power storage system 53 is a secondary battery, which is, for example, a secondhand lithium-ion battery or nickel-hydrogen battery used in vehicles. However, the power storage system 53 is not limited to a secondary battery, and may be, for example, a power-to-gas device that produces a gaseous fuel (such as hydrogen, methane) using surplus power.

The microgrid MG is connected to a power reception and transformation facility 6 and a power system 7. The power reception and transformation facility 6 is provided at a power reception point (a point of interconnection) of the microgrid MG, and capable of connection/disconnection switching between the microgrid MG and the power system 7. The power reception and transformation facility 6 includes a switch on a high voltage side (a primary side), a transformer, a protective relay, a measurement instrument, and a controller (none of which are shown).

The power system 7 is a power grid built by a power and power transmission and distribution equipment. In the present embodiment, the power company serves as a power generation utility and a power T&D utility. The power company corresponds to a general power T&D utility and an administrator of the power system 7, and maintains and manages the power system 7.

A power T&D utility server 8 is a computer that belongs to the power company and manages the demand and supply of electric power of the power system 7. The power T&D utility server 8 and the server 3 are capable of two-way communications therebetween. If surplus power is produced at the power system 7, the power T&D utility server 8 requests the server 3 to consume the surplus power. in the event of short supply of electric power from the power system 7, the power T&D utility server 8 requests the server 3 to reduce power consumption. In response to the request from the power T&D utility server 8, the server 3 adjusts the amount of electric power consumed by the microgrid MG.

FIG. 7 is a flowchart illustrating a procedure for alleviating charging congestion, according to Embodiment 2. The process steps S201 through S203 are similar to the process steps S101 through S103 according to Embodiment 1. Although, due to space constraints, the process steps are omitted which are performed when no charging congestion is predicted (NO in S202), the process steps are similar to the process steps S107 and S108 according to Embodiment 1.

After the charging mats 1 are installed at the location where charging congestion is occurred, the server 3 determines whether surplus power is produced at the power system 7 (S204). Based on a request from the power T&D utility server 8, the server 3 can determine whether surplus power is produced. If no surplus power is produced at the power system 7 (NO in S204), the server 3 determines whether electric power from the power system 7 is in short supply (S207). The server 3 can determine whether the electric power is in short supply, also based on a request from the power T&D utility server 8.

If surplus power is produced at the power system 7 (YES in S204) and the vehicle 4 is detected above the charging mat 1 (YES in S205), the controller 14 controls the power conversion unit 13 to operate in accordance with commands from the server 3, thereby transmitting electric power from the charging mat 1 to the vehicle 4 (S206). If electric power from the power system 7 is not in short supply (NO in S207), the controller 14 controls the power conversion unit 13 to operate if the vehicle 4 is detected above the charging mat 1 (YES in S208), thereby transmitting electric power from the charging mat 1 to the vehicle 4 (S209).

If electric power from the power system 7 is in short supply (YES in S207), in contrast, the controller 14 controls the power conversion unit 13 to stop in accordance with commands from the server 3 (S210). In other words, no electric power is transmitted from the charging mat 1 to the vehicle 4, irrespective of whether the vehicle 4 is detected or not.

Note that if no vehicle 4 is detected above the charging mat 1 (YES in S204 and NO in S205) while surplus power is produced at the power system 7, the controller 14 controls the power conversion unit 13 to stop. Similarly, if no vehicle 4 is detected above the charging mat 1 (NO in S207 and NO in S208) while electric power from the power system 7 is not in short supply, the controller 14 controls the power conversion unit 13 to stop. In either case, no electric power is transmitted from the charging mat 1 to the vehicle 4.

Here, comparing these cases where electric power is transmitted from the charging mat 1 to the vehicle 4, when surplus power is produced at the power system 7 (S206), the server 3 more facilitates the transmission of electric power from the charging mat 1 than when no surplus power is produced (S209). More specifically, when surplus power is produced, the server 3 can discount the charge fee, as compared to when no surplus power is produced. For example, the server 3 may perform the wireless charging in exchange for a fee if no surplus power is produced, and the server 3 may perform the wireless charging free of charge if surplus power is produced. By setting the fee in this manner, it is expected that more drivers wish for the wireless charging and surplus power is actively consumed.

Alternatively, the server 3 may confirm the driver's wish and then transmit electric power from the charging mat 1 if no surplus power is produced, and the server 3 may automatically transmit electric power from the charging mat 1 if surplus power is produced, without making an inquiry of the driver.

Electric power is transmitted from the charging mat 1 if electric power from the power system 7 is not in short supply (S209), and no electric power is transmitted from the charging mat 1 in the event of short supply of electric power (S210). Stated differently, the transmission of electric power from the charging mat 1 is reduced in the event of short supply of electric power from the power system 7, as compared to when electric power is not in short supply. Due to this, the power consumption by the microgrid MG is reduced in the event of short supply of electric power from the power system 7, thereby alleviating the short supply of electric power from the power system 7. Although not shown, in the event of short supply of electric power from the power system 7, the server 3 may raise the charge fee, as compared to when electric power is not in short supply.

As described above, even in Embodiment 2, as with Embodiment 1, if charging congestion is caused by the vehicles 4 waiting for charging by the charger 2, the charging mats 1 are installed along the line of the vehicles causing the charging congestion. This reduces the amount of time taken for the plug-in charging, thereby alleviating charging congestion.

Furthermore, in Embodiment 2, if surplus power is produced at the power system 7, the transmission of electric power from the charging mat 1 to the vehicle 4 is facilitated, as compared to when no surplus power is produced. Moreover, in the event of short supply of electric power from the power system 7, the transmission of electric power from the charging mat 1 to the vehicle 4 is reduced, as compared to when electric power is not in short supply. Thus, according to Embodiment 2, the use of the charging mats 1 can also contribute to adjustment of the electric-power supply-demand balance of the power system 7.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A method for providing, by a server, a vehicle charging service for charging a vehicle by fixed charging equipment,
    the vehicle being capable of receiving electric power supplied from the charging equipment and receiving electric power supplied from a charging mat,
    the charging mat being movable and capable of wireless power transfer,
    the method comprising:
        installing the charging mat on a lane at which charging congestion is detected or predicted to occur, the charging congestion being traffic congestion for charging of the electric power supplied from the charging equipment, and
        transmitting the electric power from the charging mat when the vehicle is detected above the charging mat installed on the lane, and transmitting no electric power from the charging mat when the vehicle is not detected above the charging mat.

2. The method according to claim 1, further comprising giving, by the server, an instruction for removing the charging mat installed on the lane when conditions for relieving the charging congestion are met.

3. The method according to claim 1, further comprising giving, by the server, an instruction for installing other charging mat on a route bypassing the lane at which the charging congestion is detected or predicted to occur, the other charging mat being movable and capable of wireless transmission of electric power.

4. The method according to claim 1, wherein
    the charging mat transmits electric power supplied from a power system to a microgrid, the method further comprising
    facilitating, by the server, transmission of the electric power from the charging mat when surplus power is produced at the power system, as compared to when no surplus power is produced at the power system.

5. The method according to claim 1, wherein
    the charging mat transmits electric power supplied from a power system to a microgrid, the method further comprising
    reducing, by the server, transmission of the electric power from the charging mat when the electric power from the power system is in short supply, as compared to when the electric power from the power system is not in short supply.

6. A vehicle charging system used to charge a vehicle by fixed charging equipment, the vehicle charging system comprising:
    a charging mat that is movable and capable of wireless transmission of electric power; and
    a server that controls the charging mat, wherein
    the vehicle is capable of receiving electric power supplied from the charging equipment and receiving the electric power transmitted from the charging mat,
    the server controls the charging mat so that the charging mat moves to a lane at which charging congestion is detected or predicted to occur, the charging congestion being traffic congestion for charging the electric power supplied from the charging equipment, and
    after moving to the lane, the charging mat performs wireless power transfer when the vehicle is detected above the charging mat, and does not perform the wireless power transfer when the vehicle is not detected above the charging mat.

* * * * *